W. Williams,
Elastic Coupling.
No. 99,508. Patented Feb. 1, 1870.
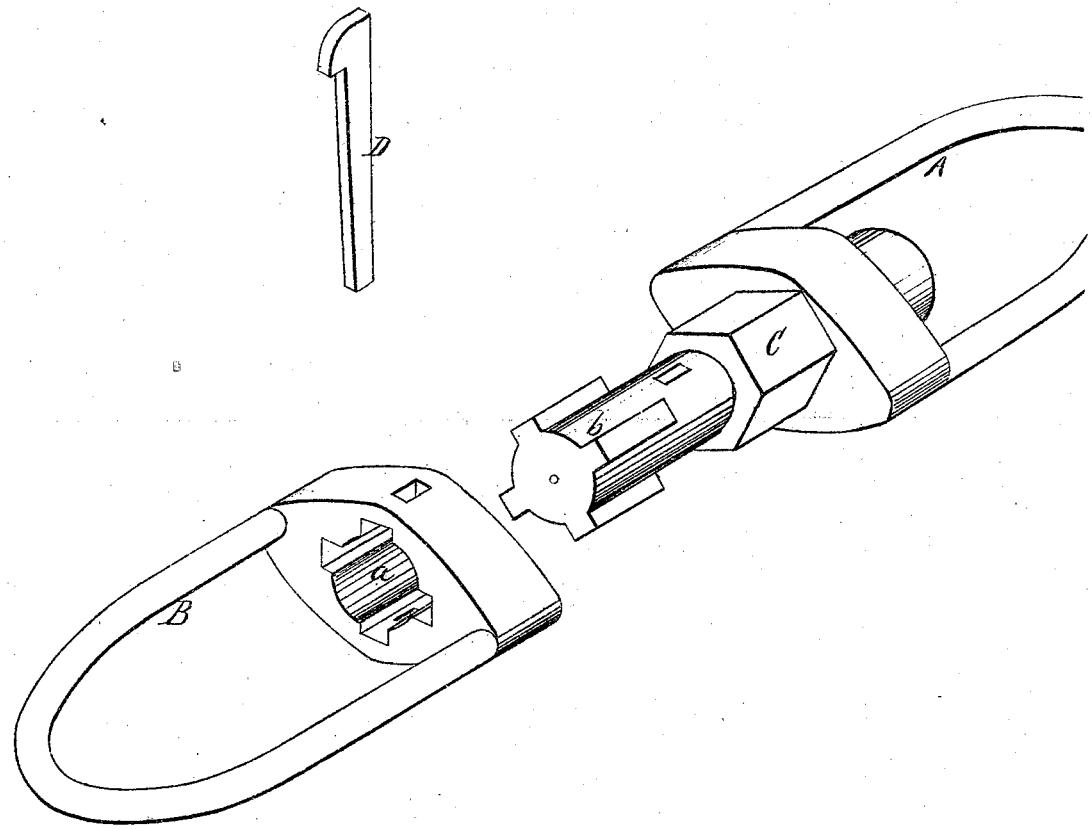
Witnesses
Geo. H. Strong
Wm. Gerlach
Inventor.
Wm Williams
By his Atty
Dewey & Co.

United States Patent Office.

WILLIAM WILLIAMS, OF VALLEJO, CALIFORNIA, ASSIGNOR TO HIMSELF AND DANIEL HARRINGTON, OF SAME PLACE.

Letters Patent No. 99,508, dated February 1, 1870.

IMPROVEMENT IN SWIVEL-SHACKLE.

The Schedule referred to in these Letters Patent and making part of the same.

*To all whom it may concern:*

Be it known that I, WILLIAM WILLIAMS, of Vallejo, county of Solano, State of California, have invented an Improved Swivel-Shackle; and I do hereby declare the following description and accompanying drawings are sufficient to enable any person skilled in the art or science to which it most nearly appertains, to make and use my said invention or improvements, without further invention or experiment.

My invention relates to an improved swivel-shackle or coupling, which may be used for connecting the chains or cables of anchors, or for other purposes where it sometimes becomes necessary to effect a rapid separation; and.

It consists of two links of a shackle, connected together by a bolt, one end of which is permanently connected with one link, while the other is made in the form of a cross or star, which is introduced to the other link, through a similarly-formed slot, after which it is turned so that its arms stand between the openings, and is there confined by means of a key.

To more fully illustrate my invention, reference is made to the accompanying drawings, forming part of this specification, in which—

A and B are two shackle-links, made flat at one end, the link A having a smooth round hole made through the flat side, to receive the connecting-bar or bolt C, and allow it to turn freely.

The flat end of the link B has a star-like opening, *a*, made through it, and the end *b* of the bar C, is formed into lugs, of a similar shape, so that when they are turned to correspond with the opening, it may be either introduced or withdrawn.

When the two parts are to be coupled together, the end of the bar C is introduced through the opening *a* in the link B, and it is then turned till the lugs stand between the openings.

A slot is make through the link, and also through the bar, and a key, D, is driven through the two while in the last-named position, so that the parts are kept in place.

The portion of the bar which extends between the links, is so formed that a wrench may be applied to turn it when under great strain.

This coupling is especially valuable for use on ships' cables, when it may be necessary to slip the cables and go to sea instantly, in which case, the key D is drawn out and the bar C is turned till it will allow the lugs to pass through the openings *a*, when the vessel, or whatever may be attached to the other part of the link, will be free.

What I claim as new, and desire to secure by Letters Patent, is—

A swivel-shackle or coupling, with the openings *a* in the link D, and the corresponding lugs on the bar C, substantially as herein described.

In witness whereof, I have hereunto set my hand and seal.

WILLIAM WILLIAMS. [L s.]

Witnesses:
WM. RAWSON,
EPHRAIM H. WADE.